United States Patent [19]

Katayama et al.

[11] Patent Number: 5,191,322
[45] Date of Patent: Mar. 2, 1993

[54] ACTIVE-MATRIX DISPLAY DEVICE

[75] Inventors: Mikio Katayama, Ikoma; Masahiro Adachi, Tenri; Hirohisa Tanaka; Hiroshi Morimoto, both of Nara, all of Japan

[73] Assignee: Sharp Kabushiki Kaisha, Osaka, Japan

[21] Appl. No.: 363,184

[22] Filed: Jun. 7, 1989

[30] Foreign Application Priority Data

Jun. 13, 1988 [JP] Japan .................. 63-145319

[51] Int. Cl.$^5$ .............................. G09G 3/36
[52] U.S. Cl. ...................... 340/783; 340/766; 340/784; 359/58; 359/60
[58] Field of Search ............... 340/784, 765, 781, 783, 340/766; 350/331 R, 332; 427/43.1; 359/58, 59, 60, 61

[56] References Cited

U.S. PATENT DOCUMENTS

| | | | |
|---|---|---|---|
| 3,519,330 | 7/1970 | Hgilmeier | 350/332 |
| 4,024,626 | 5/1977 | Leupp et al. | |
| 4,523,189 | 6/1985 | Takahara et al. | 340/781 |
| 4,704,002 | 11/1987 | Kikuchi et al. | |
| 4,766,471 | 8/1988 | Ovshinsky et al. | 357/2 |
| 4,775,549 | 8/1988 | Ota et al. | 427/43.1 |
| 4,859,623 | 8/1989 | Busta | 357/40 |

FOREIGN PATENT DOCUMENTS 2294547 7/1976 France.

OTHER PUBLICATIONS

Conference Record of 1982 International Display Research Conference, Cherry Hill, N.J., 19th-21st Oct. 1982, pp. 146-151, IEEE, New York, U.S.; A. I. Lakatos: "Promise and challenge of thin-film silicon approaches to active matrices".
SID 1983 Digest, pp. 146-149, Suzuki et al.
Japan Display 1986, pp. 192-195, Yanagisawa et al.
Appl. Phys. 1986, A41, pp. 311-314, Tanaka et al.
SID Digest 1986, pp. 293-295, Funada et al.
Proceedings of the SID, vol. 26/3, 1985, pp. 209-212, Richard et al.

Primary Examiner—Alvin E. Oberley
Assistant Examiner—Regina Liang
Attorney, Agent, or Firm—Morrison & Foerster

[57] ABSTRACT

An active-matrix display device comprising a plurality of picture elements that are arranged into a matrix and thin-film transistors that switch the picture elements, wherein an MIS-structured diode and each of the picture elements are connected with each of the thin-film transistors in parallel.

6 Claims, 3 Drawing Sheets

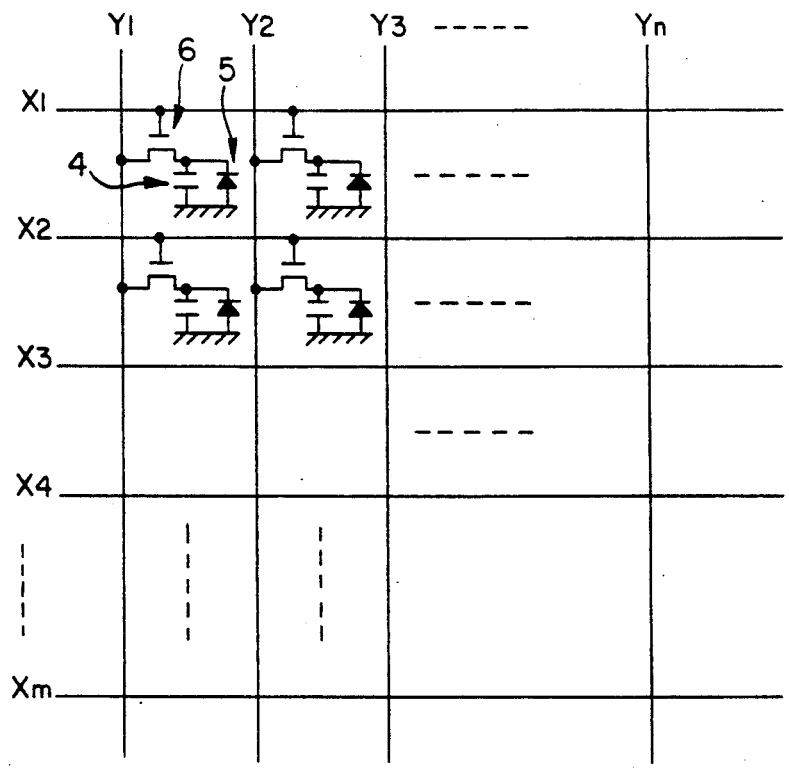
F I G. 1
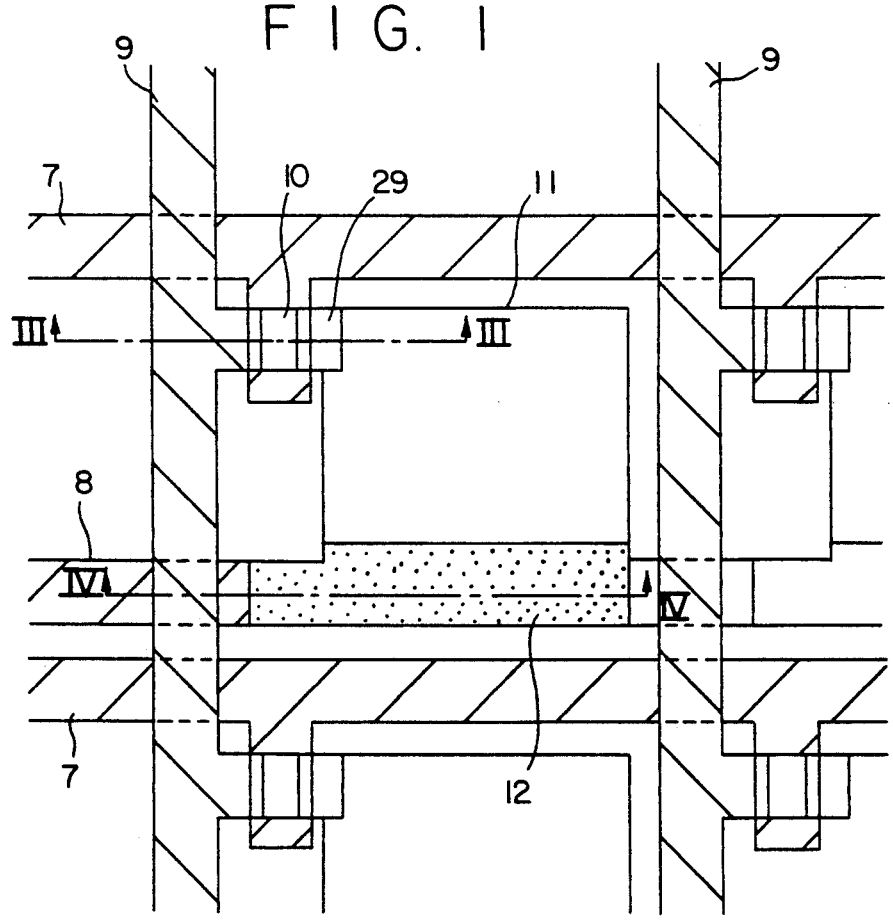
F I G. 2

ACTIVE-MATRIX DISPLAY DEVICE

BACKGROUND OF THE INVENTION

1. Field of the invention

This invention relates to an active-matrix display device such as a liquid crystal display device and so on, particularly to an active-matrix display device using thin-film transistors as switching devices.

2. Description of the prior art

A conventional active-matrix liquid crystal display device using thin-film transistors (hereinafter abbreviated as TFTs, as necessary) reduces crosstalk between the picture elements by the incorporation of TFTs thereinto, and removes limitations of the number of scanning lines. This device, therefore, gives a display device a greater capacity and higher quality as compared with a display device of simple matrix type. Even such active-matrix liquid crystal display device using TFTs, however, may incur deterioration of its image quality such as a decrease of the image contrast caused by crosstalk, in the case where the off-characteristics of the TFTs are inadequate or the off-resistance of the liquid crystal is insufficient. Moreover, occurrences of internal offset voltage within the liquid crystal cells or the application of an asymmetric voltage to the liquid crystal may cause deterioration of its image quality such as flickering, low contrast, deviation of a potential between electrodes, or the like.

To eliminate these problems, as shown in FIG. 6, a conventional active-matrix display device connected with a parallel circuit of the corresponding picture element 1 and the corresponding capacitance 2. The capacitance 2 alleviates deterioration of the image quality caused by inadequate off-characteristics of TFTs 3 and insufficient off-resistance of the liquid crystal.

However, the conventional display device mentioned above cannot fully resolve the deterioration problem of the image quality caused by an internal offset voltage within the liquid crystal cells and an asymmetric voltage applied to the liquid crystal.

SUMMARY OF THE INVENTION

The active-matrix display device of this invention, which overcomes the above-discussed and numerous other disadvantages and deficiencies of the prior art, comprises a plurality of picture elements that are arranged into a matrix and thin-film transistors that switch said picture elements, wherein an metal-insulated-semiconductor (MIS)-structured diode and each of said picture elements are connected with each of said thin-film transistors in parallel.

In a preferred embodiment, the thin-film transistors are amorphous silicon thin-film transistors.

In a preferred embodiment, gate insulating films of each of said thin-film transistors are formed by a two-layered film of tantalum oxide and silicon nitride or a two-layered film of tantalum oxide and silicon oxide.

In a preferred embodiment, insulating films are formed by a double layered film of tantalum oxide and silicon nitride or a two-layered film of tantalum oxide and silicon oxide.

Thus, the invention described herein makes possible the objective of providing an active-matrix display device that prevents deterioration of the image quality caused by an internal offset voltage of the liquid crystal or an asymmetrical voltage applied to the liquid crystal.

BRIEF DESCRIPTION OF THE DRAWINGS

This invention may be better understood and its numerous objects and advantages will become apparent to those skilled in the art by reference to the accompanying drawings as follows:

FIG. 1 is an equivalent circuit of an active-matrix display device of this invention.

FIG. 2 is a plane view showing a part of the display device of this invention.

DESCRIPTION OF THE PREFERRED EMBODIMENTS

This invention provides an active-matrix display device in which each picture element and an MIS diode with a lamination of a metal layer, an insulating film, and semiconductor layers is connected with each TFT in parallel. In the case where a positive or negative voltage is applied to a display means (e.g., liquid crystal) or an MIS diode through the picture element electrode, the applied voltage begins to decay while being divided capacitively between the parasitic capacitance within the TFT, and a parallel circuit composed of the liquid crystal and the MIS diode, at the moment when the TFT is switched over from the On state to the Off state. In this case, since the capacitance capacity of the MIS diode changes depending upon the polarity of the bias voltage, the applied voltage capacitively divided changes, as well. The capacitance of the MIS diode varies so as to alleviate the asymmetry of the applied voltage that is caused by the parasitic capacitance of the TFT and the off-resistance of the liquid crystal. Thus, it is possible to effectively prevent the image quality from being deteriorated by the internal offset voltage and asymmetrically applied voltage.

EXAMPLES

Figure 6:
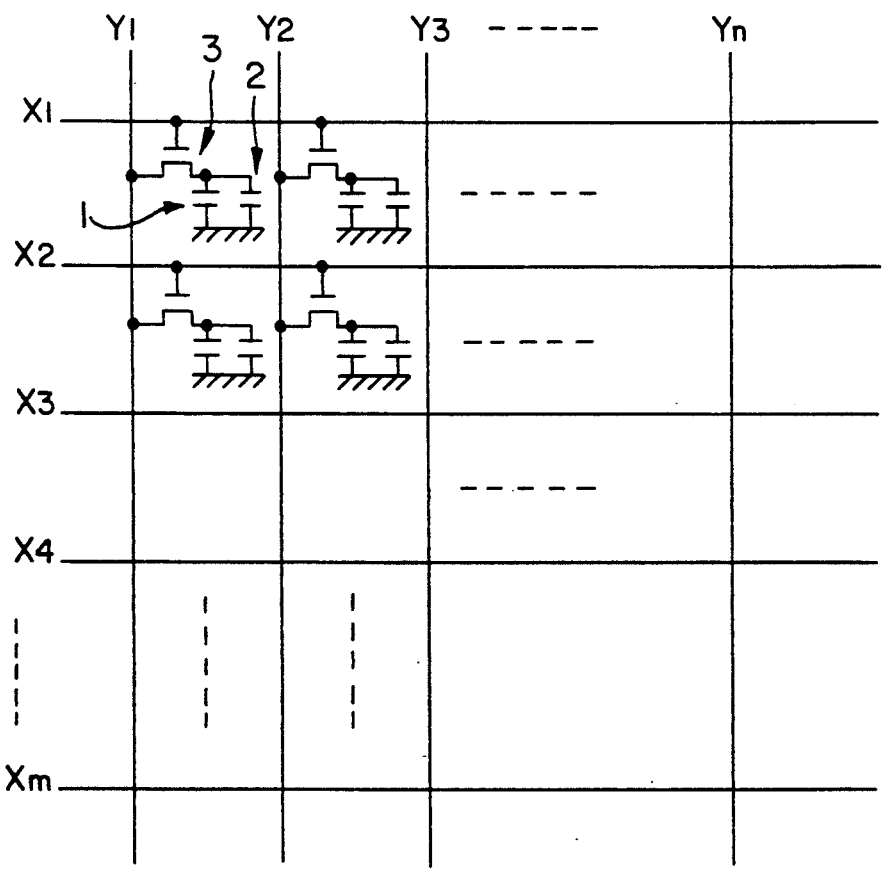
FIG. 6 is an equivalent circuit of a conventional active-matrix display device.

FIG. 1 shows an equivalent circuit of a liquid crystal display device of this invention, in which $X_l$ to $X_m$ show gate bus lines, and $Y_l$ to $Y_n$ show source bus lines. A number of picture elements 4 are arranged into a matrix, each of which is connected with a TFT 6 of amorphous silicon (a-Si) to drive the said picture element 4. An MIS diode 5 is connected to each picture element 4 in parallel; that is, instead of capacitance 2 (FIG. 6) of the above-mentioned conventional display device, the MIS-structured diode 5 is connected to each picture element 4.

Figure 3:
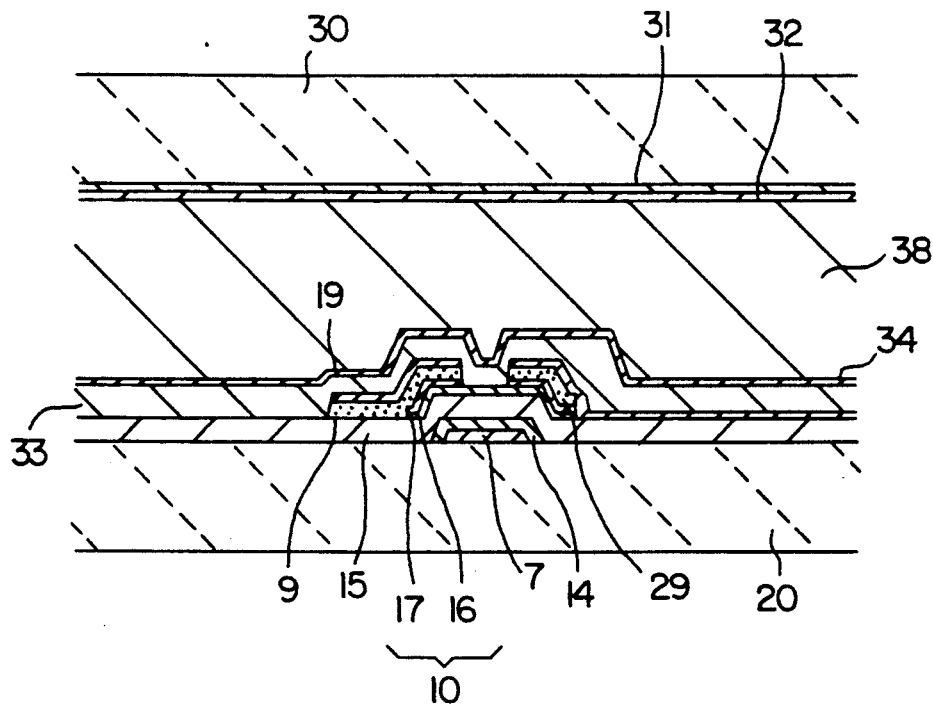
FIG. 3 is a sectional view showing the display device taken along line III—III of FIG. 2.
Figure 4:
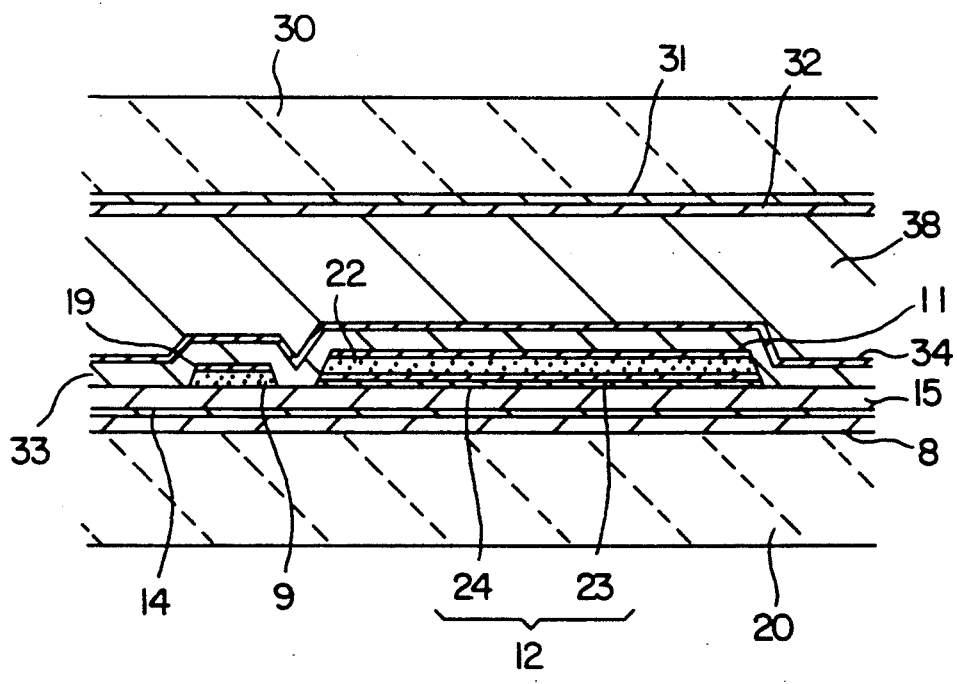
FIG. 4 is a sectional view showing the display device taken along line IV—IV of FIG. 2.

The display device with the above-mentioned circuit structure is produced as follows:

Tantalum is applied to a thickness of about 3000 Å on a glass substrate 20 by sputtering, and patternized by photolithography to form gate wirings 7 and diode wirings 8 (as shown in FIG. 3).

Then, the surface of the tantalum film is oxidized by anodic oxidation to form an insulating layer 14 of tantalum oxide ($Ta_2O_5$).

Then, by plasma chemical vapor deposition, an insulating layer 15 with a thickness of 3000 Å of silicon nitride (SiNx), intrinsic amorphous silicon (a-Si(i)) layers 16 and 24 with a thickness of 300 Å each, and n-type amorphous silicon (a-Si(n+)) layers 17 and 23 with a thickness of 500 Å each are formed in this order.

Then, by photolithography, the a-Si(i) layers 16 and 24, and a-Si(n+) layers 17 and 23 are patternized into islands, forming patterns 10 and 12.

Thereafter, titanium (Ti) is applied to a thickness of 3000 Å by sputtering on those patterns, and patternized by photolithography to form source wirings 9, drain electrodes 29, and diode electrodes 22.

Indium Tin Oxide (ITO) is then formed to a thickness of 1000 Å by sputtering, and patternized by photolithography to form picture element electrodes 11 and source wirings 9 and 19. In this way, TFTs 6 are formed in which MIS-structured diodes 5 are formed by a lamination of the tantalum oxide layer 14, the silicon nitride layer 15, the a-Si(n+) layer 24, and a-Si(i) layer 23 that are formed on the wirings 8.

Then, silicon nitride (SiNx) is applied to a thickness of 4000 Å by plasma chemical vapor deposition to form a protective film 33, on which an orientation film 34 is formed, resulting in a substrate for use in a liquid crystal display device.

Then, the said substrate is stuck with a glass substrate 30 on which a transparent electrode 31 of ITO and an orientation film 32 has been disposed. A liquid crystal 38 is put into a space between these substrates. The wirings 8 for the MIS diodes are electrically connected with the transparent electrode 31, resulting in an active-matrix display device in which the MIS-structured diode 5 and the corresponding picture element 4 are connected with the corresponding TFT 6 in parallel.

Next, operation for compensating the asymmetric voltage applied to the liquid crystal is described below: In the case where a positive or negative voltage is applied to the picture element 4 and the MIS diode 5 through the picture element electrode, the applied voltage begins to decay while being divided capacitively between the parasitic capacitance between the drain and the source within the TFT 6, and a parallel circuit capacitance composed of the picture element 4 and diode 5, at the moment when the TFT 6 is switched over from the On state to the Off state. In this case, since the capacitance of the MIS diode 5 changes depending upon the polarity of the bias voltage, the voltage to be applied to the picture element 4 and the MIS diode 5 by the above-mentioned capacitive division changes, as well.

Figure 5:
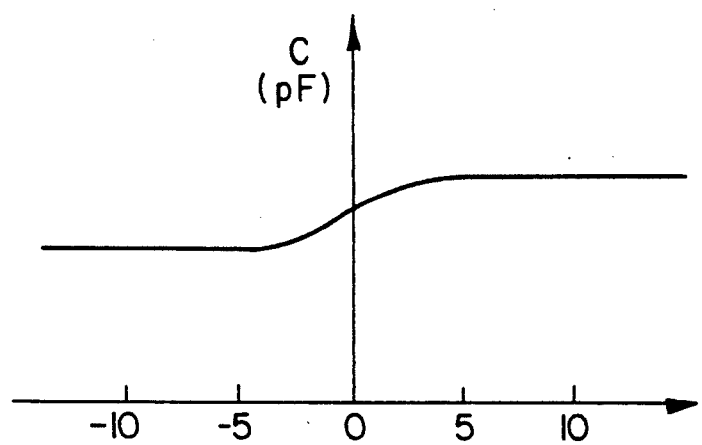
FIG. 5 is of a graph showing the capacitance-voltage characteristics of the MIS diode of the display device.

Since the above-mentioned display device uses the amorphous silicon of a lightly n-doped semiconductor as a semiconductor layer of the MIS diode, the capacitance of the MIS diode becomes large when a positive bias voltage from the viewpoint of the counter-electrode is applied (i.e., when a negative bias voltage from the viewpoint of the drain electrode is applied) (FIG. 5). Accordingly, decay of the voltage applied to the liquid crystal is decelerated. On the other hand, when negative bias voltage from the viewpoint of the counter-electrode (i.e., a positive bias voltage from the viewpoint of the drain electrode) is applied, the capacitance of the MIS diode becomes small. Accordingly, decay of the voltage applied to the liquid crystal is accelerated.

The above-mentioned phenomenon of the deceleration and the acceleration of decay of the applied voltage acts so as to alleviate asymmetry of the positive and negative voltage applied to the liquid crystal, caused by the parasitic capacitance between the drain and the source of TFT or by the off-resistance of the liquid crystal. Accordingly, even though voltage is asymmetrically applied to the liquid crystal, since the asymmetry of the applied voltage is alleviated, it is possible to effectively suppress deterioration of the image contrast, flickering, etc. caused by the said asymmetry. Furthermore, it is possible to prevent occurrence of such defect as reduction of a time constant of the liquid crystal, deviation of a potential between electrodes, etc.

The above-mentioned example uses double layered films of tantalum oxide and silicon nitride as a gate insulting film of the TFT and an insulating film of the MIS diode, but one or both of those insulating films can be a double layered film of tantalum oxide and silicon oxide, or a single-layered film of silicon nitride or silicon oxide only.

As mentioned above, since each of the MIS-structured diodes and the corresponding picture element are connected with the TFT in parallel, this invention makes it possible for the diode to compensate for asymmetry of the voltage applied to each picture element so as to alleviate it. Thus, it is possible to effectively prevent deterioration of the image quality caused by internal offset voltage or asymmetrical voltage applied to a display means such as the liquid crystal, thereby attaining a great improvement of the image quality of the display device.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active-matrix display device comprising
a plurality of picture elements that are arranged into a matrix, thin-film transistors that switch said picture elements, and MIS-structured diodes that correspond to the respective picture elements,
wherein each of said MIS-structured diodes is connected in parallel with the associated picture element, and each parallel arrangement of one of said diodes and said associated picture element is connected in series with an associated transistor, said MIS-structured diodes being constructed so that the capacitance of the MIS-diode becomes asymmetric according to the direction of a bias voltage to compensate for a asymmetric voltage to be applied to each picture element.

2. An active-matrix display device according to claim 1, wherein said thin-film transistors are amorphous silicon thin-film transistors.

3. An active-matrix display device according to claim 1, wherein each of said thin-film transistors has a gate insulating film, said gate insulating film being formed by a two-layered film of tantalum oxide and silicon nitride.

4. An active-matrix display device according to claim 1, wherein each of said MIS-structured diodes has an insulating film, said insulating film being formed by a two-layered film of tantalum oxide and silicon nitride.

5. An active-matrix display device according to claim 1, wherein each of said thin-film transistors has a gate insulating film, said gate insulating film being formed by a two-layered film of tantalum oxide and silicon oxide.

6. An active-matrix display device according to claim 1, wherein each of said MIS-structured diodes has an insulating film, said insulating film being formed by a two-layered film of tantalum oxide and silicon oxide.

* * * * *

UNITED STATES PATENT AND TRADEMARK OFFICE
CERTIFICATE OF CORRECTION

PATENT NO. : 5,191,322
DATED : 03/02/93
INVENTOR(S) : Mikio Katayama, Masahiro Adachi, Hirohisa Tanaka, Hiroshi Morimoto It is certified that error appears in the above-identified patent and that said Letters Patent is hereby corrected as shown below:

IN THE DRAWINGS

In FIG. 3: Line to Reference number 19 is

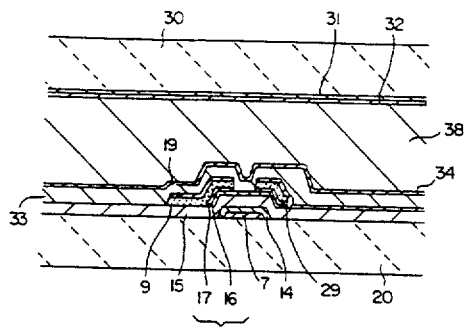

should be

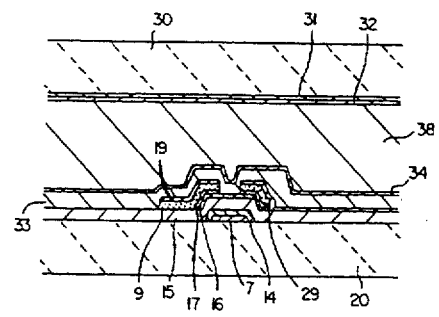

Column 3, Line 14:

"source wiring 9 and 19" should read --source wiring 19--.

Signed and Sealed this

Fourteenth Day of December, 1993

*Attest:*

BRUCE LEHMAN

*Attesting Officer*   Commissioner of Patents and Trademarks